US011423150B2

(12) United States Patent
Areno et al.

(10) Patent No.: US 11,423,150 B2
(45) Date of Patent: Aug. 23, 2022

(54) SYSTEM AND METHOD FOR BOOTING PROCESSORS WITH ENCRYPTED BOOT IMAGE

(71) Applicant: Raytheon Company, Waltham, MA (US)

(72) Inventors: Matthew C. Areno, Round Rock, TX (US); Jody R. Coleman, Chapin, SC (US); Daniel Adams, Gray Court, SC (US)

(73) Assignee: Raytheon Company, Waltham, MA (US)

( * ) Notice: Subject to any disclaimer, the term of this patent is extended or adjusted under 35 U.S.C. 154(b) by 129 days.

(21) Appl. No.: 16/371,191

(22) Filed: Apr. 1, 2019

(65) Prior Publication Data

US 2020/0082092 A1 Mar. 12, 2020

Related U.S. Application Data

(60) Provisional application No. 62/728,235, filed on Sep. 7, 2018.

(51) Int. Cl.
*G06F 9/00* (2006.01)
*G06F 15/177* (2006.01)
(Continued)

(52) U.S. Cl.
CPC .............. *G06F 21/575* (2013.01); *G06F 1/24* (2013.01); *G06F 21/606* (2013.01);
(Continued)

(58) Field of Classification Search
CPC ............. G05B 2219/36542; G06F 1/24; G06F 21/575; G06F 21/606; G06F 2221/033; H04L 9/0866; H04L 9/0897
See application file for complete search history.

(56) References Cited

U.S. PATENT DOCUMENTS 6,473,857 B1 10/2002 Panas et al.
7,260,555 B2 8/2007 Rossmann et al.
(Continued)

FOREIGN PATENT DOCUMENTS

EP 1 764 721 A2 3/2007
EP 3 422 661 A1 1/2019
(Continued)

OTHER PUBLICATIONS

PCT International Search Report and Written Opinion dated Aug. 11, 2020 for International Application No. PCT/US2019/045607; 12 Pages.

(Continued)

*Primary Examiner* — Nitin C Patel
(74) *Attorney, Agent, or Firm* — Schwegman Lundberg & Woessner, P.A.

(57) ABSTRACT

The concepts, systems and methods described herein are directed towards a method for secure booting. The method is provided to including: loading and executing a firmware in a Management Engine (ME) of a system; establishing, by the ME, a communication channel to a security device; receiving, by the ME, an encrypted boot image from the security device; decrypting, by the ME, the encrypted boot image; storing, by the ME, the decrypted boot image in a secured storage medium; and resetting the system using the decrypted boot image in the secured storage medium.

12 Claims, 5 Drawing Sheets

(51) Int. Cl.
- *G06F 21/57* (2013.01)
- *G06F 1/24* (2006.01)
- *H04L 9/08* (2006.01)
- *G06F 21/60* (2013.01)
- *H04L 9/06* (2006.01)

(52) U.S. Cl.
CPC .......... *H04L 9/0631* (2013.01); *H04L 9/0866* (2013.01); *H04L 9/0897* (2013.01); *G05B 2219/36542* (2013.01); *G06F 2221/033* (2013.01)

(56) References Cited

U.S. PATENT DOCUMENTS

| | | |
|---|---|---|
| 9,235,709 B2 | 1/2016 | Kim et al. |
| 9,251,343 B1 | 2/2016 | Vincent et al. |
| 9,319,380 B2 | 4/2016 | Lukacs et al. |
| 9,509,587 B1 | 11/2016 | Marquardt et al. |
| 9,600,291 B1 | 3/2017 | Atsatt |
| 9,626,512 B1 | 4/2017 | Brandwine et al. |
| 10,027,717 B2 | 7/2018 | Ben-Shalom et al. |
| 2004/0003262 A1 | 1/2004 | England et al. |
| 2004/0177260 A1* | 9/2004 | Gilfix ............... G06F 21/52 713/193 |
| 2005/0138409 A1 | 6/2005 | Sheriff et al. |
| 2006/0015748 A1 | 1/2006 | Goto et al. |
| 2006/0026417 A1 | 2/2006 | Furusawa et al. |
| 2008/0307488 A1 | 12/2008 | Hammond, II et al. |
| 2009/0204964 A1 | 8/2009 | Foley et al. |
| 2010/0070743 A1 | 3/2010 | Grigor et al. |
| 2010/0250796 A1 | 9/2010 | Jevans et al. |
| 2011/0302638 A1 | 12/2011 | Cha et al. |
| 2014/0068275 A1* | 3/2014 | Swanson ............... G06F 21/575 713/192 |
| 2014/0298026 A1 | 10/2014 | Isozaki et al. |
| 2015/0012737 A1 | 1/2015 | Newell |
| 2016/0125187 A1 | 5/2016 | Oxford |
| 2016/0147996 A1* | 5/2016 | Martinez ............... G06F 21/572 713/2 |
| 2016/0162669 A1* | 6/2016 | Mikhailov ............ G06F 21/445 713/2 |
| 2016/0378996 A1 | 12/2016 | Smith et al. |
| 2017/0104770 A1 | 4/2017 | Jreij et al. |
| 2017/0132417 A1* | 5/2017 | Martinez ............... G06F 21/602 |
| 2017/0180318 A1 | 6/2017 | Lutas et al. |
| 2017/0213053 A1 | 7/2017 | Areno et al. |
| 2017/0364685 A1 | 12/2017 | Shah et al. |
| 2018/0034793 A1 | 2/2018 | Kibalo et al. |
| 2018/0089425 A1 | 3/2018 | Trikalinou |
| 2018/0165448 A1 | 6/2018 | Nightingale et al. |
| 2018/0255077 A1 | 9/2018 | Paine |
| 2018/0260009 A1 | 9/2018 | Roeder |
| 2018/0278418 A1 | 9/2018 | Chang et al. |
| 2018/0365425 A1 | 12/2018 | Packer Ali et al. |
| 2019/0042516 A1 | 2/2019 | Browning et al. |
| 2019/0050604 A1 | 2/2019 | Weber et al. |
| 2019/0073478 A1* | 3/2019 | Khessib ............. G06F 13/4072 |
| 2019/0266331 A1 | 8/2019 | Sanchez Diaz et al. |
| 2021/0034733 A1 | 2/2021 | Grobelny et al. |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

U.S. Notice of Allowance dated Aug. 24, 2020 for U.S. Appl. No. 16/214,857; 7 Pages.
PCT International Search Report and Written Opinion dated Jul. 13, 2020 for International Application No. PCT/US2020/025195; 12 Pages.
PCT International Search Report and Written Opinion dated Jul. 14, 2020 for International Application No. PCT/US2019/045610; 12 Pages.
Response to U.S. Non-Final Office Action dated May 14, 2020 for U.S. Appl. No. 16/214,857; Response Filed Jul. 30, 2020; 7 Pages.
PCT International Preliminary Report dated Oct. 22, 2020 for International Application No. PCT/US2019/022879; 9 Pages.
U.S. Non-Final Office Action dated May 14, 2020 for U.S. Appl. No. 16/214,857; 23 Pages.
PCT International Search Report and Written Opinion dated Jun. 26, 2020 for International Application No. PCT/US2019/045608; 16 Pages.
PCT International Search Report and Written Opinion dated Jun. 25, 2020 for International Application No. PCT/US2020/025178; 12 Pages.
U.S. Non-Final Office Action dated Jan. 26, 2021 for U.S. Appl. No. 16/255,917; 26 pages.
U.S. Appl. No. 16/722,142, filed Dec. 20, 2019, Hird et al.
U.S. Appl. No. 16/832,192, filed Mar. 27, 2020, Staab.
U.S. Appl. No. 16/832,216, filed Mar. 27, 2020, Staab et al.
U.S. Appl. No. 16/214,857, filed Dec. 10, 2018, Areno et al.
U.S. Appl. No. 16/255,917, filed Jan. 24, 2019, Areno et al.
U.S. Appl. No. 16/398,641, filed Apr. 30, 2019, Areno et al.
PCT International Search Report and Written Opinion dated May 31, 2019 for International Application No. PCT/US2019/022879; 16 Pages.
Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.
Cooper et al., "BIOS Protection Guidelines," *National Institute of Standards and Technology*—Special Publication 800-147; U.S. Department of Commerce; Apr. 2011; 26 Pages.
Regenscheid et al., "BIOS Integrity Measurement Guidelines (Draft);" *National Institute of Standards and Technology*—Special Publication 800-155; U.S. Department of Commerce; Dec. 2011; 47 Pages.
Regenscheid, "BIOS Protection Guidelines for Servers;" *National Institute of Standards and Technology*—NIST Special Publication 800-147B; U.S. Department of Commerce; Aug. 2014; 32 Pages.
Trusted Computing Group, "Trusted Platform Module Library, Part 1: Architecture;" Family "2.0", Level 00, Revision 01.16; TCG Published; Oct. 30, 2014; 147 Pages (Part 1 of 2).
Trusted Computing Group, "Trusted Platform Module Library, Part 1: Architecture;" Family "2.0", Level 00, Revision 01.16; TCG Published; Oct. 30, 2014; 121 Pages (Part 2 of 2).
Wilkins et al., "UEFI Secure Boot in Modern Computer Security Solutions;" www.UEFI.org; Sep. 2013; 10 Pages.
Response to U.S. Non-Final Office Action dated Jan. 26, 2021 for U.S. Appl. No. 16/255,917; Response filed on Mar. 23, 2021; 7 pages.
Non-Final Office Action dated Apr. 29, 2021 for U.S. Appl. No. 16/398,641; 38 Pages.
PCT International Preliminary Report dated Mar. 18, 2021 for International Application No. PCT/US2019/045607; 7 pages.
PCT International Preliminary Report dated Mar. 18, 2021 for International Application No. PCT/US2019/045610; 7 pages.
PCT International Preliminary Report dated Mar. 18, 2021 for International Application No. PCT/US2019/045608; 11 pages.
Non-Final Office Action dated Jul. 2, 2021 for U.S. Appl. No. 16/255,917; 17 Pages.
Response to Non-Final Office Action filed Sep. 29, 2021 for U.S. Appl. No. 16/255,917; 8 Pages.
International Preliminary Report on Patentability dated Oct. 14, 2021 for PCT Application No. PCT/US2020/025195; 7 Pages.
International Preliminary Report on Patentability dated Oct. 14, 2021 for PCT Application No. PCT/US2020/025178; 7 Pages.
U.S. Non-Final Office Action dated Jul. 2, 2021 for U.S. Appl. No. 16/255,917; 21 pages.
Response to U.S. Non-Final Office Action dated Apr. 29, 2021 for U.S. Appl. No. 16/398,641; Response filed on Jul. 23, 2021; 10 pages.

(56) References Cited

OTHER PUBLICATIONS

Notice of Allowance dated Nov. 12, 2021 for U.S. Appl. No. 16/255,917; 13 Pages (Attorney Docket No. RTN-A043AUS).

* cited by examiner

SYSTEM AND METHOD FOR BOOTING PROCESSORS WITH ENCRYPTED BOOT IMAGE

CROSS-REFERENCE TO RELATED APPLICATIONS

This application claims the benefit of U.S. Provisional Application No. 62/728,235 filed Sep. 7, 2018 under 35 U.S.C. § 119(e) which application is hereby incorporated herein by reference in its entirety.

BACKGROUND

Protection of firmware codes, such as Basic Input/Output System (BIOS) or Unified Extensible Firmware Interface (UEFI), is necessary to establish a secure booting and executing environment. However, such firmware codes may not be protectable during transit from a storage to a processor when the processor is only able to execute unencrypted images. Although these firmware codes may be cryptographically signed by a provider, they are unencrypted and may contain unsigned $3^{rd}$ party software elements. Thus, it may be possible to extract the firmware for reverse engineering or perform other security attacks using the unencrypted firmware codes. The inability to use encrypted firmware may pose security risks for programs with high-security requirements.

SUMMARY

In accordance with the concepts, techniques and systems described herein provide methods and apparatus for transmitting an encrypted boot image to a system, decrypting locally, and executing on a processor in the system.

According to one illustrative embodiment, a method for secure booting may include: loading and executing a firmware in the ME; establishing, by the ME, a communication channel to a security device; receiving, by the ME, an encrypted boot image from the security device; decrypting, by the ME, the encrypted boot image; storing, by the ME, the decrypted boot image in the secured storage medium; and resetting the system using the decrypted boot image in the secured storage medium.

In one aspect, the system may comprise a System-on-a-Chip (SoC).

In one aspect, the encrypted boot image may be encrypted using a unique key that is generated by the ME.

In one aspect, the unique key may comprise a unique-per-processor key that is generated based upon unique key material of the processor, wherein the unique key material of the processor is accessible by the ME.

In one aspect, the method may further include: loading, by the ME, an unencrypted boot image; encrypting, by the ME, the unencrypted boot image using the unique key; and storing, by the ME, the encrypted boot image in the security device. In another aspect, the method may further include: generating, by the ME, an Advanced Encryption Standard (AES) key; encrypting, by the ME, the unencrypted boot image using the AES key; encrypting, by the ME, the AES key; and storing, by the ME, the encrypted boot image and the encrypted AES key in the security device.

In one aspect, the security device may comprise a Hardware Root of Trust (HRoT) device.

In one aspect, the security device may comprise a network server.

In one aspect, the communication channel to the security device may comprise an encrypted communication channel.

In one aspect, the method may further include: transferring data to and from the security device via the communication channel.

According to another illustrative embodiment, a system for secure booting may include: a processor and memory; a management engine (ME); and a secured storage medium. Herein, the ME may be configured to: load and execute a firmware; establish a communication channel to a security device; receive an encrypted boot image from the security device; decrypt the encrypted boot image; and store the decrypted boot image in the secured storage medium. Furthermore, the system may reset using the decrypted boot image in the secured storage medium.

In one aspect, the ME may be further configured to: load an unencrypted boot image from the security device; generate a unique-per-processor key; encrypt the unencrypted boot image using the unique-per-processor key; and store the encrypted boot image in the security device.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term Management Engine (ME), INTEL Management Engine (IME), or Converged Security and Management Engine (CSME) (hereinafter "ME") is used to describe an autonomous subsystem incorporated in some processor chipsets produced by INTEL. The ME is a part of Intel Active Management Technology for performing tasks on a system remotely. The ME is located in a Platform Controller Hub (PCH) of an Intel-based motherboard or a System-on-a-Chip (SoC).

As used herein, the term "Root of Trust (RoT)" refers to a trusted computing module that provides a set of functions that are trusted by other modules in a computing environment, such as an Operating System (OS). The RoT may serve as an independent computing module providing authenticity of a computer or mobile device in which it is embedded. The term "Hardware Root of Trust (HRoT)" device is used to describe a hardware device that provides RoT functions. The HRoT device generally provides, but not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and/or ensuring that the system is able to be brought into a known and trusted state.

Figure 1:
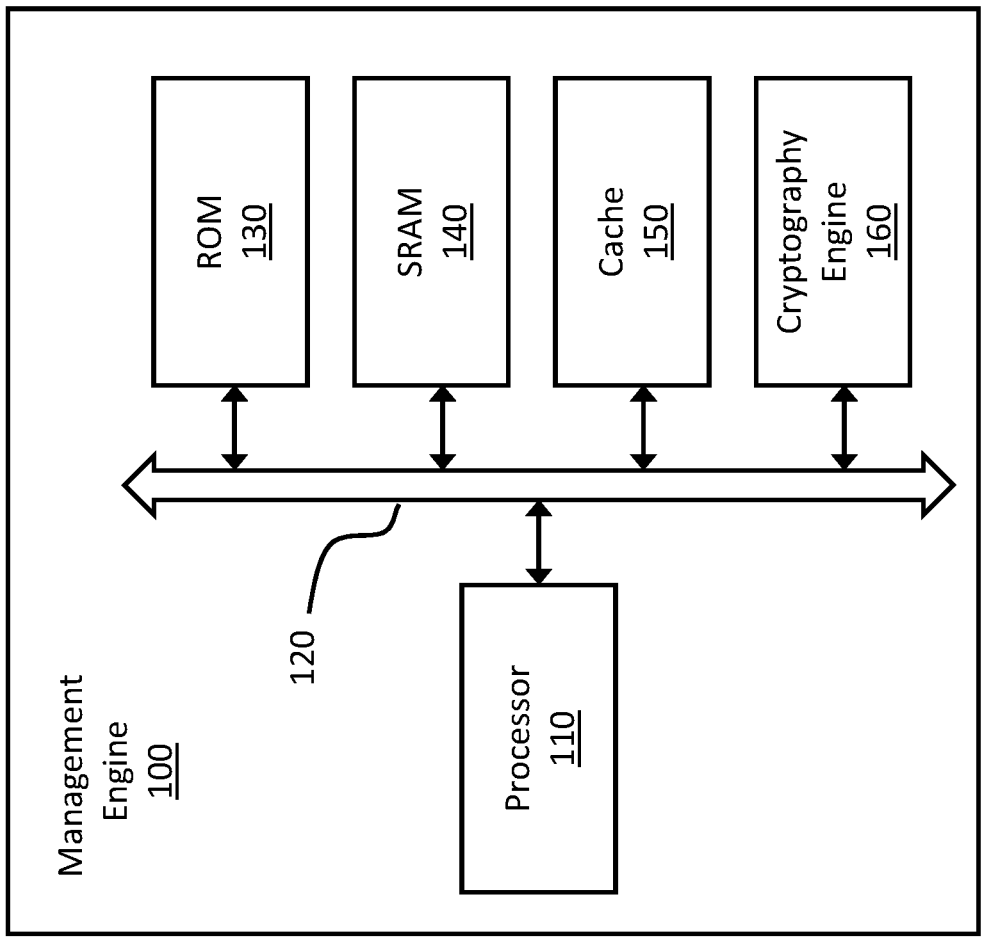
FIG. 1 is a block diagram of conventional Management Engine (ME) system.

Referring now to FIG. 1, a conventional Management Engine (ME) 100 is presented. The ME is a separate processing subsystem located inside a modern motherboard or SoC package. The ME may have a processor 110, Read-only Memory (ROM) 130, Static Random-Access Memory (SRAM) 140, cache 150, and a cryptography engine 160. The ME 100 may include other elements or modules including, but not limited to, an interrupt controller, high precision and watch dog timer, Direct Memory Access (DMA) engine, and others. The processor 110 and other elements are connected via an internal bus 120. As can be appreciated by a person in the pertinent art, there can be variations in the architecture of the ME. The ME is located inside of a Platform Controller Hub (PCH), as shown in FIG. 2.

The ME 100 is running as long as its host system (motherboard or SoC, e.g., 230 in FIG. 2) has power, regardless of whether the host processor is executing. That is, even if a computer system is turned off, the ME is capable of continuing to execute as long as there is a power connection to the host system 230. The ME has its own Operating System (OS), applications, and memory address space to support its security and management operations. One of the responsibilities of the ME is to generate and maintain device specific cryptographic keys. These keys may be accessible from outside through a collection of technologies, including Identity Protection Technology (IPT), Trusted eXecution Engine (TXE), and Dynamic Application Loader (DAL). The IPT, TXE, and DAL are technologies provided by INTEL. Through the technologies, an authorized developer can create custom applications that can run on the processor 110 of the ME 100.

Figure 2:
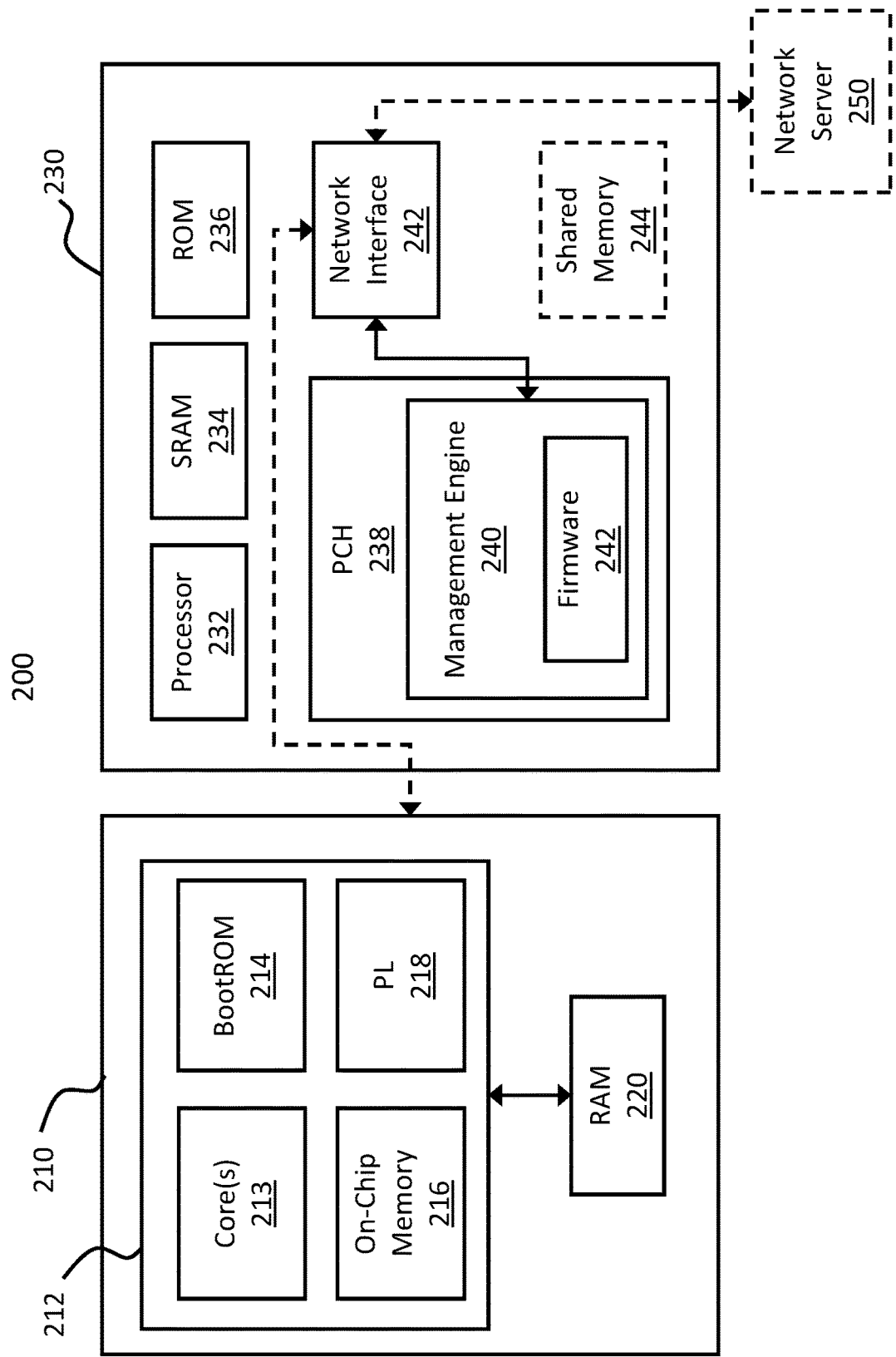
FIG. 2 is a block diagram showing an architecture of a Hardware Root of Trust (HRoT) device and a host platform comprising an ME according to the concepts described herein.

Referring now to FIG. 2, an illustrative security system 200 may include a Hardware Root of Trust (HRoT) device 210 and a host platform. The HRoT device 210 and the host platform 230 may be respective independent systems with similar setups. Each of the systems may have its own processor, memory and other interfaces. In embodiments, the host platform 230 may include a central processing unit (CPU) 232, Static RANI 234, ROM 236, Platform Controller Hub (PCH) 238, and network interface 242. An ME 240 that is located in the PCH 238 may have a substantially similar architecture as the ME 100 presented in conjunction with FIG. 1. That is, the ME 240 may have its own processor (e.g., 110 in FIG. 1) and one or more memory modules.

In embodiments, the HRoT device 210 may include a multi-core processor 212 and memory 220. The processor 212 of the HRoT device 210 may include one or more cores 213 configured similarly with the processor 232 of the host platform 230. The processor 212 may also include a boot read-only memory (BootROM) 214, on-chip memory 216, and programmable logic 218. The processor 212 of an HRoT device 210 generally requires higher security features than a conventional processor being used in a system that does not require higher security. In some embodiments, the HRoT device 210 may comprise a substantially similar architecture with the host platform 230. The BootROM 214 can be a place where the HRoT device 210 loads and executes secure boot codes that initialize a secure booting procedure of the HRoT device 210. The on-chip memory 216 may perform as storage for boot loader codes that are loaded and executed by the secure boot codes. The on-chip memory 216 may be volatile and maintain OS and other application for operation of the processor 212. The PL 218 may perform as a storage for a security monitoring application that is loaded and executed by the boot loader codes. As can be appreciated by those of ordinary skill in the pertinent art, the processor 212 may have more or lesser number of on-chip and off-chip storages than what is described in FIG. 2. It should also be appreciated that the structure of processor 232 in the host platform 230 may have a similar structure with the processor 212 in the HRoT device 210. In other embodiments, the secure boot code and boot loader codes may be loaded and executed in the same on-chip or off-chip memory, for example BIOS flash in an INTEL processor. Further, a security monitoring app may be loaded and executed in the same memory or storage where the boot codes are loaded.

The ME 210 is connected to a host platform 230 through a communication channel. The communication channel may be Host Embedded Controller Interface (HECI) bus. Through the HECI, the ME can communicate to the OS of the host platform. The ME 210 may also access unique key material stored inside a processor 232 of its host platform. The unique key material of the processor is uniquely signed to each processor by a provider of the processor. Further, the ME 210 may have access to an on-board network interface device 242. The ME 210 may have access to the network interface even when the system is in a low-power state or a sleep mode, without the host OS knowing that the network interface 242 is being accessed by the ME 210.

When the host platform 230 is first booted, the ME 240 initially loads an initial firmware from a storage medium. In some embodiments, the storage that stores the initial firmware may be the ROM or SRAM (e.g., 130, 140 in FIG. 1) of the ME 240. In other embodiments, the initial firmware may be stored in and loaded from a shared memory located on the host platform 230 or BIOS flash in an INTEL processor (not shown). Herein, the initial firmware may be a custom firmware (sometimes referred as a "custom ME application"), which can be loaded into the internal SRAM (e.g., 140 in FIG. 1) of the ME 240 during the boot sequence. The custom firmware 242 then may access the network interface 242 to establish a secure communication channel with the HRoT device 210. As stated above, the ME 240 may access the network interface 242 even when the host platform 230 is not running. In some embodiments, the ME 240 and the HRoT device 210 may perform an authorization procedure before establishing the secure communication channel.

Once a secure communication channel is established between the ME 240 and the HRoT device 210, the custom firmware 242 in the ME 240 may receive an encrypted boot image (BIOS or UEFI) from the HRoT device 210. Further, the ME 240 and the HRoT device 210 may transfer data to each other through the secure communication channel. In some embodiments, the ME may receive the encrypted boot image from another type of security device, such as a network server 250 that is accessible by the ME 240. The network server 250 may be a Network-Attached Storage (NAS) or any other suitable device that functions as a storage device. In embodiments, the ME 240 can access a cryptographic key to be used to decrypt the received encrypted boot image. In some embodiments, the cryptographic key may be generated by the ME 240 and stored in the ME 240. Herein, the encrypted boot image may be previously encrypted by the ME 240 and stored in the HRoT device 210 or the network server 250, as will be described in detail in conjunction with FIG. 4.

When the firmware 242 of the ME 240 decrypts the encrypted boot image, the ME 240 stores the decrypted boot image into a secured storage medium. In embodiments, the secured storage medium may be the shared memory 244 of the host platform 230. In other embodiments, the secured storage medium may be the SRAM 234 or any other suitable storage that the processor 232 may access during its booting sequence. Then, the firmware 242 of the ME 240 may restart the host platform 230. When the host platform restarts, the ME 240 may intervene during the booting process such that the processor 232 fetches the decrypted boot image instead of an unencrypted and non-trusted boot image. Herein, the processor 232 may boot using an encrypted image from a secured storage medium, such as the HRoT device 210. Accordingly, fetching unencrypted boot image for reverse engineering or other security attacks may be prevented. In some embodiments, the encrypted image may be stored in an external flash element along with the unencrypted image, stored on a peripheral device of the system (such as the HRoT device 210), or stored on a networked server 250.

In embodiments, instead of immediately restarting the process 232, the ME 240 may hold the processor 232 in reset until the ME 240 is ready with the decrypted BIOS code to serve the processor 232. In some embodiments, the ME 240 may fetch one or more blocks that are being executed from the encrypted boot image, decrypt, send to the processor 232. Accordingly, the ME 240 may use less storage space while executing than holding the entire boot image.

In embodiments, the encryption of the boot image could be performed by creating a random Advanced Encryption Standard (AES) key and using the random AES key to encrypt the boot image. That random AES key could be encrypted with a unique-per-device key generated by the ME 240. In some embodiments, the ME 240 may generate the unique-per-device key based upon the unique key material in the processor 232. The unique key material in the processor 232 may be accessible only by the ME 240. The ME 240 may store the encrypted boot image and associated encrypted AES key in a storage device, such as the HRoT device 210. In the embodiments in which a Root of Trust (RoT) device (e.g., the HRoT device 210) is used or an RoT relationship is established with an external system (e.g., the network server 250), a shared secret material, such as a public key or certificate from a trusted server that are associated with the provisioning of the encrypted image, may be established between the RoT device and the ME 240 based upon the unique-per-device cryptographic key generated by the ME 240. In some embodiments, based upon this shared secret material, the ME 240 and the RoT device may establish a session key during boot-up that would allow the boot image to be uniquely encrypted every time the host platform 230 boots. Accordingly, it may be possible to provide even more secure executing environments because the boot image is encrypted with a different key whenever the host platform 230 reboots. In other embodiments, the ME 240 may support "asymmetric" keys for the encryption. Herein, the ME 240 may generate a private/public key pair and send the public key to a network server 250, which then uses the public key to encrypt the boot image. When the ME 240 gets the encrypted boot image, the ME 240 may use the pairing private key to encrypt the boot image.

Figure 3:
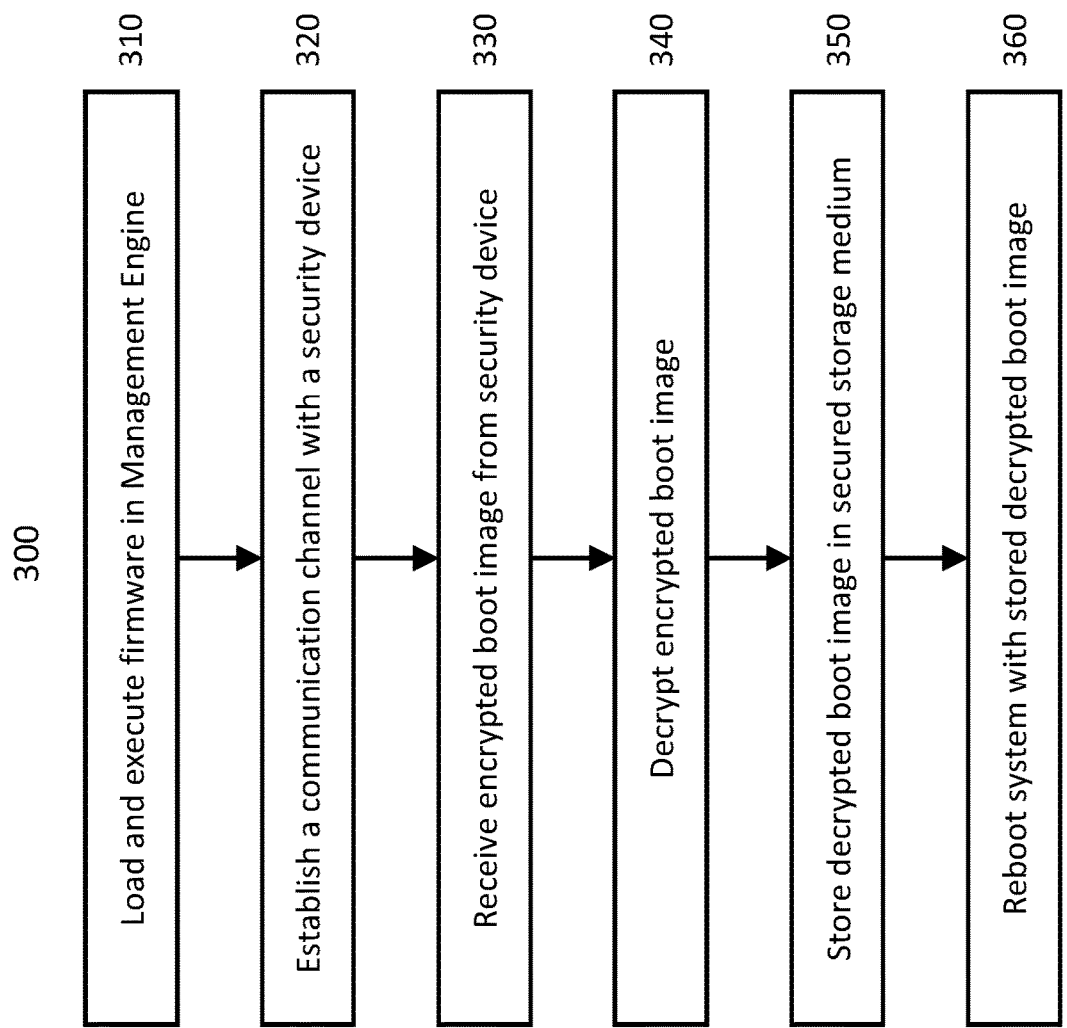
FIG. 3 is a flowchart of a secure booting process according to the concepts described herein.
Figure 4:
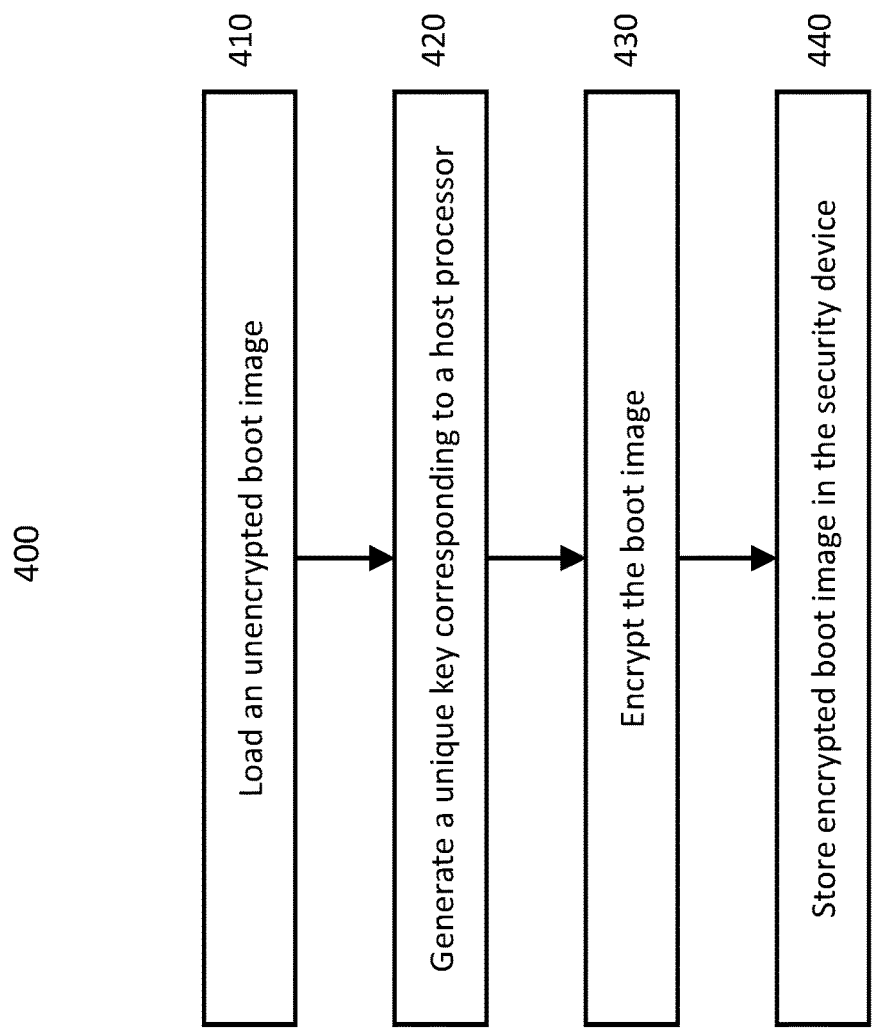
FIG. 4 is a flowchart of creating an encrypted boot image according to the concepts described herein.

FIGS. 3-4 are flow diagrams illustrating the processing performed by an ME (e.g., 240 in FIG. 2) and an HRoT device (e.g., 210 in FIG. 2). Rectangular elements (typified by element 310 in FIG. 3), herein denoted "processing blocks," represent computer software instructions or groups of instructions and diamond shaped elements (not shown), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a secure booting process 300 may be carried out by an ME (e.g., 240 in FIG. 2) and an HRoT device (e.g., 210 in FIG. 2). In processing step 310, when a host platform (e.g., 230 in FIG. 2) is first booted, the ME 240 may load an initial firmware from a storage device. Herein, the initial firmware may be a custom firmware that is loaded into the internal SRAM (e.g., 140 in FIG. 1) of the ME 240. In processing step 320, the custom firmware (e.g., 242 in FIG. 2) may access a network interface 242 and establish a secure communication channel with the HRoT device 210. Once a secure communication channel is established between the ME 240 and the HRoT device 210, in processing step 330, the custom firmware 242 may receive an encrypted boot image (BIOS or UEFI) from the HRoT device 210. In some embodiments, the ME may receive the encrypted boot image from another type of security device, such as a network server 250. In processing step 340, the ME 240 decrypts the received encrypted boot image using an encryption key. In processing step 350, the ME 240 may store the decrypted boot image into a secured storage medium. Then, in processing step 360, the firmware 242 of the ME 240 resets the host platform 230. When the host platform 230 restarts, the processor 232 may fetch the decrypted boot image from the secured storage medium and boot the system using the decrypted boot image.

Referring now to FIG. 4, a process 400 for creating an encrypted boot image may be carried out by an ME (e.g., 240 in FIG. 2). In processing step 410, the ME 240 may fetch an unencrypted boot image and load the image in the ME 240. In embodiments, the unencrypted boot image may be fetched from an HRoT device (e.g., 210 in FIG. 2). In other embodiments, the unencrypted boot image may come from any suitable storage that the ME 240 can access. In processing step 420, the ME 240 may generate a unique-per-device key corresponding to a processor (e.g., 232 in FIG. 2) of its host platform (e.g., 230 in FIG. 2). In some embodiments, the ME 240 may generate the unique-per-device key based upon unique key material in the processor 232. In processing step 430, the ME 240 may encrypt the boot image using the unique-per-device key. In some embodiments, a random Advanced Encryption Standard (AES) key may be generated, and the random AES key is used to encrypt the boot image. Herein, the random AES key is encrypted with the unique-per-device key generated by the ME 240 and stored along with the encrypted boot image. In processing step 440, the ME 240 may store the encrypted boot image in a security device, such as the HRoT device 210 or a network server 250.

Figure 5:
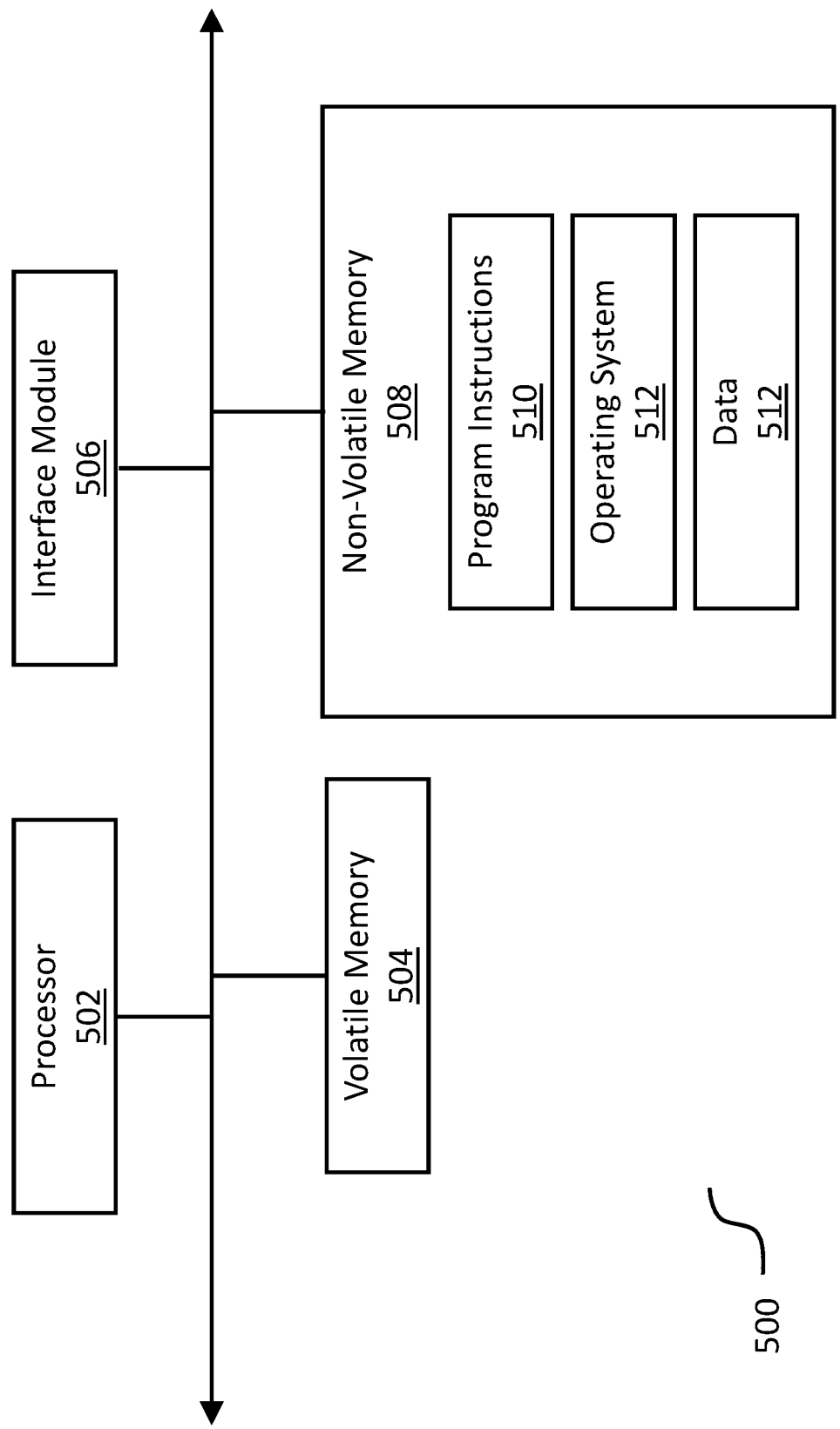
FIG. 5 is an illustrative implementation of a security system described in FIG. 2 according to the concepts described herein.

Referring now to FIG. 5, an illustrative implementation of a processing device 500 which may be suitable to implement the processing techniques described herein includes a processor 502, a volatile memory 504, a non-volatile memory 508 (e.g., hard disk) and the interface module 508 (e.g., a user interface, USB interface and so forth). The non-volatile memory 508 stores computer instructions 510, an operating system 512 and data 514. In one example, the computer instructions 510 are executed by the processor 502 out of volatile memory 504 to perform all or part of the processes described herein (e.g., processes 300, 400).

The processes described herein (e.g., processes 300, 400) are not limited to use with hardware and software of FIG. 1-2 or 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method for secure booting of a system comprising a processor, a management engine (ME) and a secured storage medium, the method comprising:
   loading and executing a firmware in the ME;
   establishing, by the ME, a communication channel to a security device, the security device comprises a Hardware Root of Trust (HRoT) device, wherein the HRoT device and the system that is being booted are respective independent systems;
   receiving, by the ME, an encrypted boot image from the security device;
   decrypting, by the ME, the encrypted boot image;
   storing, by the ME, the decrypted boot image in the secured storage medium; and
   resetting the system using the decrypted boot image in the secured storage medium;
   loading, by the ME, an unencrypted boot image;
   encrypting, by the ME, the unencrypted boot image using a unique key;
   storing, by the ME, the encrypted boot image in the security device;
   generating, by the ME, an Advanced Encryption Standard (AES) key;
   encrypting, by the ME, the unencrypted boot image using the AES key;
   encrypting, by the ME, the AES key; and
   storing, by the ME, the encrypted boot image and the encrypted AES key in the security device;
   wherein the encrypted boot image is generated using the unique key that is generated by the ME.

2. The method of claim 1, wherein the unique key comprises a unique-per-processor key that is generated based upon unique key material of the processor, wherein the unique key material of the processor is accessible by the ME.

3. The method of claim 1, further comprising:
   transferring data to and from the security device via the communication channel.

4. A system comprising:
   a processor and memory;
   a management engine (ME); and a secured storage medium;
wherein the ME is configured to:
- load and execute a firmware;
- establish a communication channel to a security device, the security device comprises a Hardware Root of Trust (HRoT) device wherein the HRoT device and the system that is being booted are respective independent systems;
- receive an encrypted boot image from the security device;
- decrypt the encrypted boot image;
- store the decrypted boot image in the secured storage medium,
wherein the system resets using the decrypted boot image in the secured storage medium;
- load, by the ME, an unencrypted boot image;
- encrypt, by the ME, the unencrypted boot image using a unique key;
- store, by the ME, the encrypted boot image in the security device;
- generate, by the ME, an Advanced Encryption Standard (AES) key;
- encrypt, by the ME, the unencrypted boot image using the AES key;
- encrypt, by the ME, the AES key; and
- store, by the ME, the encrypted boot image and the encrypted AES key in the security device;
wherein the encrypted boot image is generated using the unique key that is generated by the ME.

5. The system of claim 4, wherein the security device comprises a network server.

6. The system of claim 4, wherein the comprises a System-on-a-Chip (SoC).

7. The system of claim 4, wherein the communication channel to the security, device comprises an encrypted communication channel.

8. The system of claim 4, wherein the ME is located in a Platform Controller Hub (PCH) of the system.

9. A method for secure booting of a system comprising a processor, a management engine (ME) and a secured storage medium, the method comprising:
- loading and executing a firmware in the ME;
- establishing, by the ME, a communication channel to a security device, the security device comprises a Hardware Root of Trust (HRoT) device;
- loading, by the ME, an unencrypted boot image;
- encrypting, by the ME, the unencrypted boot image using a unique key that is generated by the ME;
- storing, by the ME, the encrypted boot image in the security device;
- loading, by the ME, an unencrypted boot image;
- encrypting, by the ME, the unencrypted boot image using the unique key;
- storing, by the ME, the encrypted boot image in the security device;
- generating, by the ME, an Advanced Encryption Standard (AES) key;
- encrypting, by the ME, the unencrypted boot image using the AES key;
- encrypting, by the ME, the AES key; and
- storing, by the ME, the encrypted boot image and the encrypted AES key in the security device;
wherein the encrypted boot image is generated using the unique key that is generated by the ME.

10. The method of claim 9, wherein the unencrypted boot image is fetched from the HRoT device.

11. The method of claim 9, wherein the unencrypted boot image is retrieved from storage that is accessible by the ME.

12. The method of claim 9, further comprising:
- receiving, by the ME, the encrypted boot image from the security device;
- decrypting, by the ME, the encrypted boot image;
- storing, by the ME, the decrypted boot image in the secured storage medium; and
- resetting the system using the decrypted boot image in the secured storage medium.

* * * * *

UNITED STATES PATENT AND TRADEMARK OFFICE
CERTIFICATE OF CORRECTION

| | | |
|---|---|---|
| PATENT NO. | : 11,423,150 B2 | |
| APPLICATION NO. | : 16/371191 | |
| DATED | : August 23, 2022 | |
| INVENTOR(S) | : Areno et al. | |

It is certified that error appears in the above-identified patent and that said Letters Patent is hereby corrected as shown below:

In the Drawings

Sheet 5 of 5, Fig. 5, reference numeral 512, Line 2 (Second Occurrence), delete "512" and insert --514-- therefor In the Specification In Column 2, Line 31, after "of", insert --a--

In Column 3, Line 65, delete "RANI" and insert --RAM-- therefor

In Column 5, Line 41, delete "232," and insert --200,-- therefor

In Column 7, Line 26, delete "508" and insert --506-- therefor

In the Claims

In Column 9, Line 33, in Claim 6, after "wherein the", insert --system--

In Column 9, Line 36, in Claim 7, delete "security," and insert --security-- therefor Signed and Sealed this
Twenty-seventh Day of June, 2023

Katherine Kelly Vidal
*Director of the United States Patent and Trademark Office*